United States Patent [19]

Meadows et al.

[11] Patent Number: 5,661,714
[45] Date of Patent: Aug. 26, 1997

[54] CD-ROM HANDLING APPARATUS AND METHOD

[76] Inventors: John W. Meadows, 28025 Arastradero Rd., Los Altos Hills, Calif. 94022; Thomas V. Fugate, 1942 Huxlay Ct., San Jose, Calif. 95125

[21] Appl. No.: 229,277

[22] Filed: Apr. 18, 1994

[51] Int. Cl.⁶ .......................... G11B 17/04; G11B 17/22
[52] U.S. Cl. .............................. 369/178; 369/36
[58] Field of Search ................ 369/36, 291, 77.2, 369/178; 360/92, 133

[56] References Cited

U.S. PATENT DOCUMENTS

| | | | |
|---|---|---|---|
| 4,773,058 | 9/1988 | Petruchik et al. | 369/77.2 |
| 4,853,916 | 8/1989 | Tomita | 369/36 |
| 5,142,523 | 8/1992 | Kamoshita | 369/77.2 |
| 5,206,845 | 4/1993 | Baxter et al. | 369/34 |
| 5,208,002 | 5/1993 | Suzuki et al. | 360/133 |

FOREIGN PATENT DOCUMENTS

| | | | |
|---|---|---|---|
| 56-74873 | 6/1981 | Japan | 369/77.2 |
| 59-30263 | 2/1984 | Japan | 369/36 |
| 61-233463 | 10/1986 | Japan | 360/92 |

*Primary Examiner*—Robert S. Tupper
*Assistant Examiner*—David D. Davis
*Attorney, Agent, or Firm*—Flehr Hohbach Test Albritton & Herbert LLP

[57] ABSTRACT

CD-ROM caddy for use in a system having a transport mechanism for transferring CD-ROMs between storage locations and drive units. The caddy has a pair of handles formed in an edge portion thereof, with apertures adjacent to the handles permitting access to the handles. The caddy is withdrawn from a storage location or a drive unit by advancing a pair of axially extending fingers with laterally extending hook portions toward the caddy with the fingers passing to one side of the caddy. When the hook portions are aligned with the apertures, the fingers are moved laterally to position the hook portions in the apertures, then the fingers are retracted with the hook portions engaging the handles to withdraw the caddy with the fingers.

5 Claims, 4 Drawing Sheets

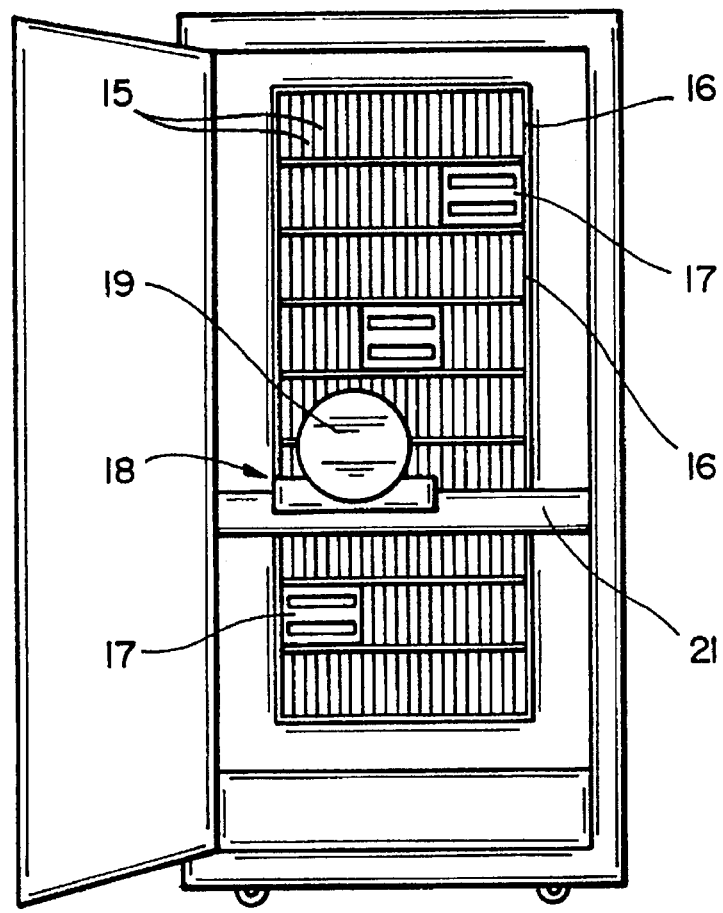
FIG_1
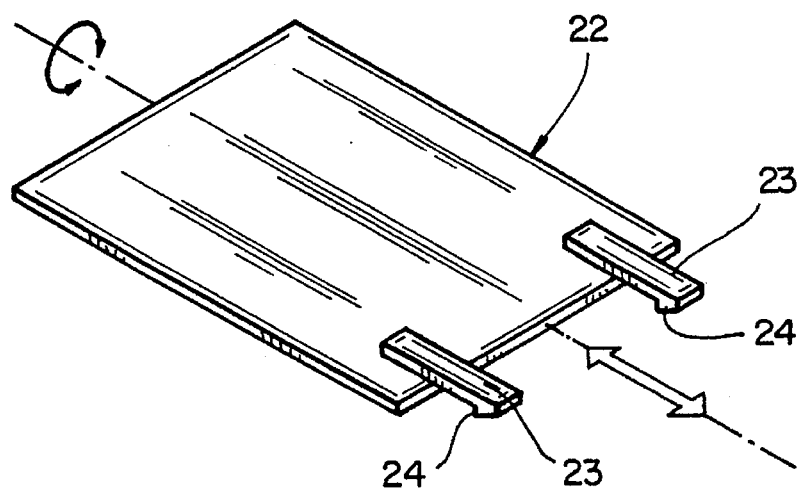
FIG_2

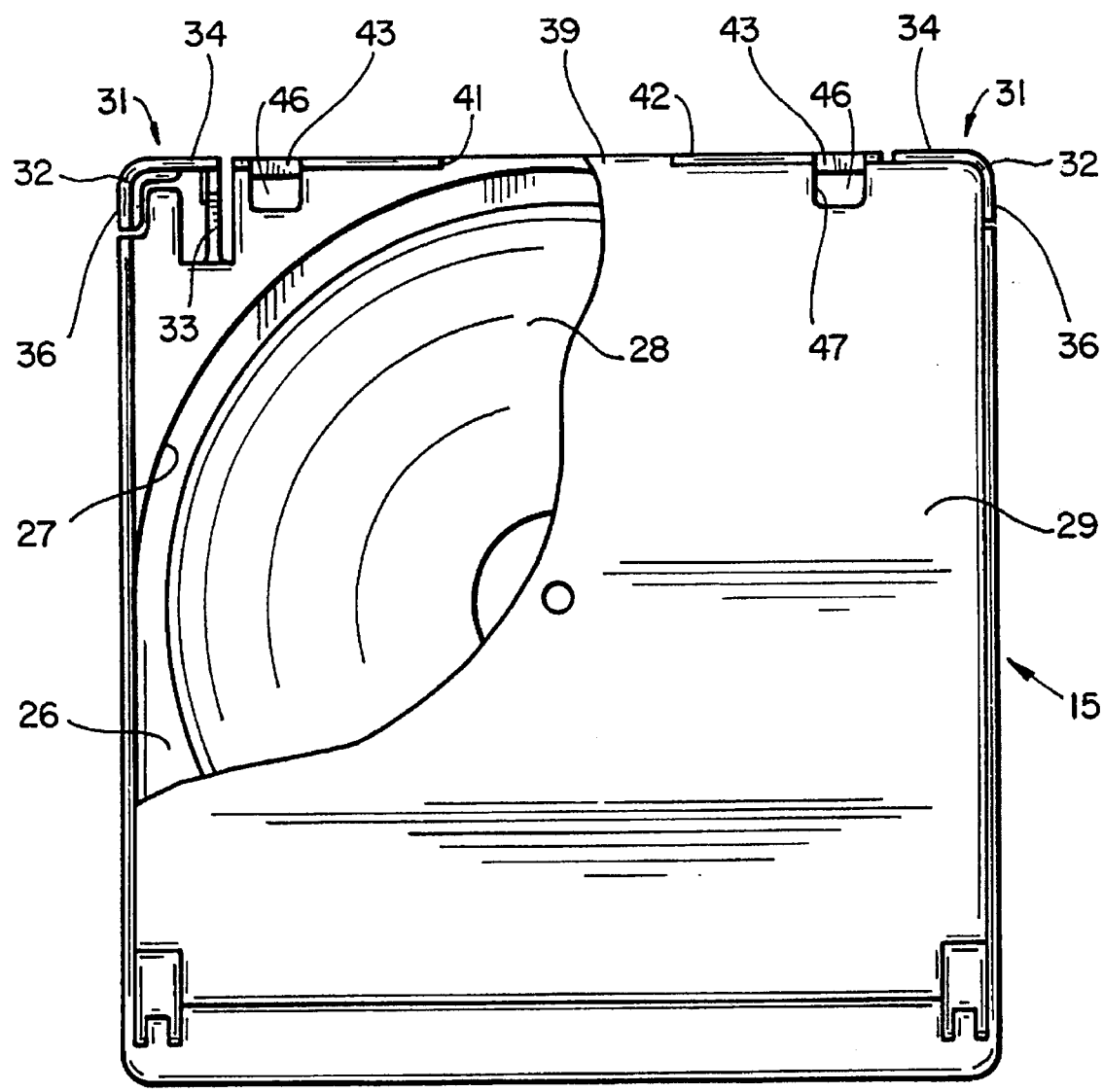
FIG_3
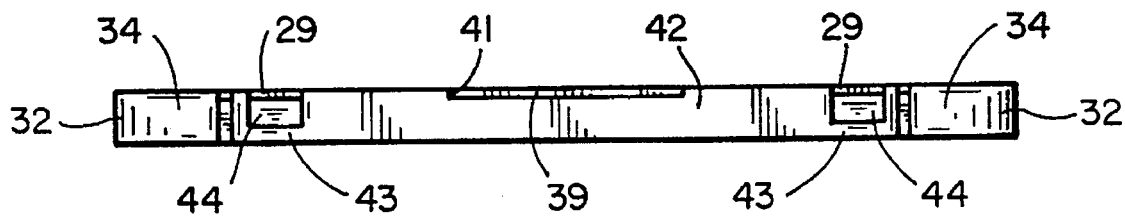
FIG_4

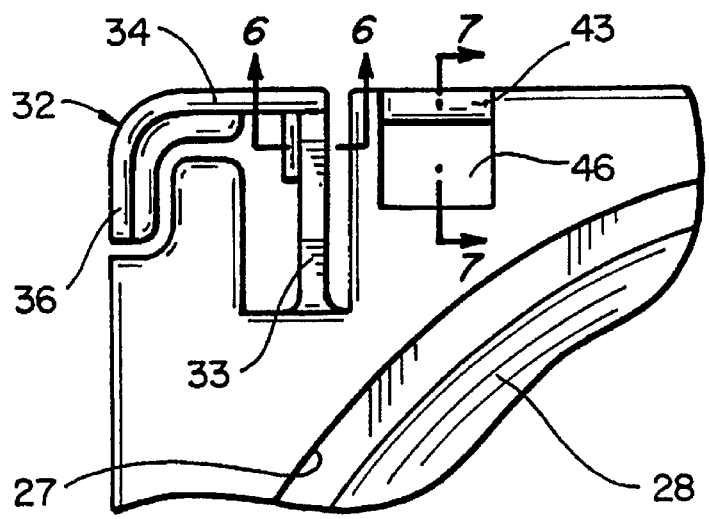
FIG_5
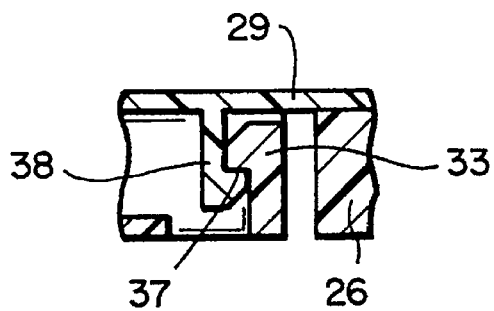
FIG_6
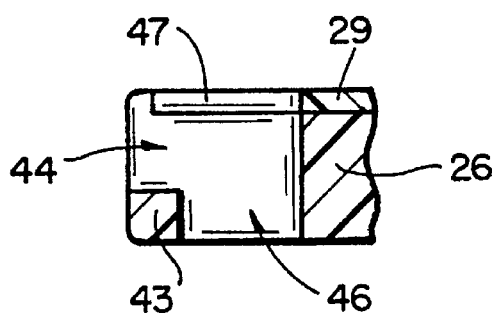
FIG_7

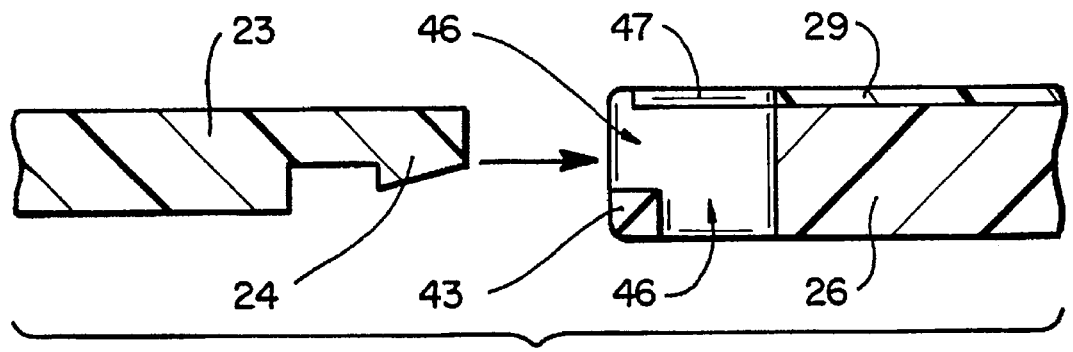
FIG_8
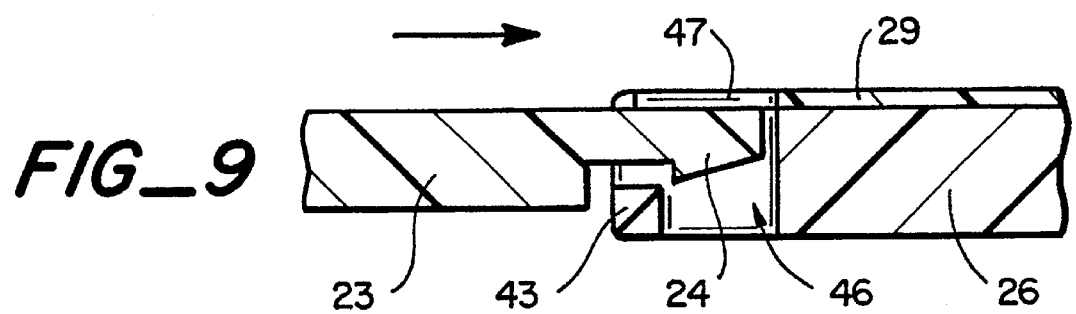
FIG_9
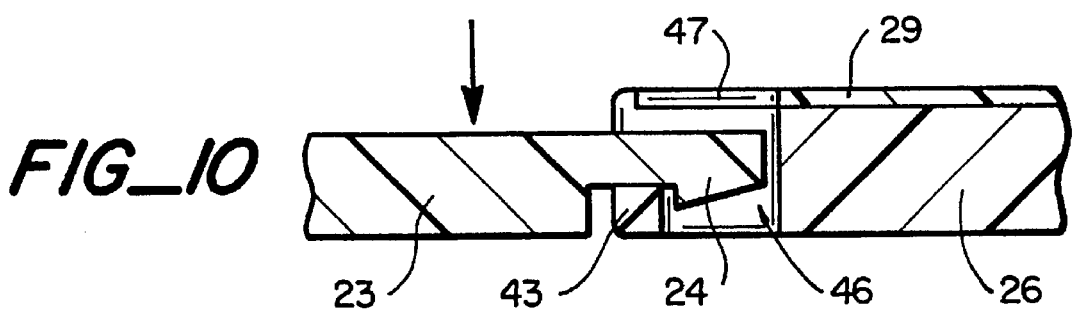
FIG_10
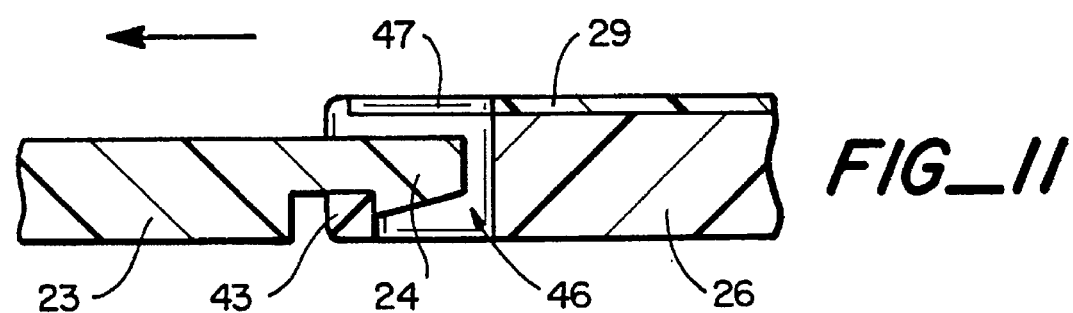
FIG_11

CD-ROM HANDLING APPARATUS AND METHOD

BACKGROUND OF THE INVENTION

1. Field of Invention

This invention pertains generally to data storage and retrieval systems and, more particularly, to apparatus and a method for handling CD-ROMs in such systems.

2. Related Art

CD-ROMs (compact disc read-only memories) and other optical storage media have found increasingly wide use in recent years where relatively large amounts of data are to be stored and retrieved. To protect such media, they are usually placed in protective cases or enclosures, which in the case of CD-ROMs are known as "caddies".

To increase the amount of data which is available, CD-ROMs and other optical storage discs are sometimes arranged in groups or "libraries" with mechanisms for transferring the discs between storage locations and one or more transcribing units where data is written to or read from the them. Such systems are sometimes referred to as "juke boxes" because of their similarity to machines of that name for playing phonograph records, and one example of such a system is found in U.S. Pat. No. 5,206,845.

In order to transfer a disc or cartridge between a storage location and a transcribing unit, a transport mechanism must engage the case in which the disc is enclosed and withdraw the cartridge as a unit from its current location. The cases in which optical storage discs are commonly enclosed have ears or tabs at the corners thereof which can be engaged relatively easily by the transport mechanism. The caddies most commonly employed with CD-ROMs, however, have no such means, and can only be gripped by squeezing the opposite faces thereof. This does not always provide a good grip on the caddy, and the forces exerted on the case can damage the caddy and/or the disc therein.

OBJECTS AND SUMMARY OF THE INVENTION

It is in general an object of the invention to provide a new and improved apparatus and method for handling CD-ROMs.

Another object of the invention is to provide an apparatus and method of the above character which overcome the limitations and disadvantages of the techniques heretofore employed in handling CD-ROMs.

These and other objects are achieved in accordance with the invention by providing a CD-ROM caddy having a pair of handles formed in an edge portion thereof, with apertures adjacent to the handles. The caddy is withdrawn from a storage location or a drive unit by advancing a pair of axially extending fingers with laterally extending hook portions toward the caddy with the fingers passing to one side of the caddy. When the hook portions are aligned with the apertures, the fingers are moved laterally to position the hook portions in the apertures, then the fingers are retracted with the hook portions engaging the handles to withdraw the caddy with the fingers.

BRIEF DESCRIPTION OF THE DRAWINGS

FIG. 1 is a front elevational view one embodiment of a system with apparatus for handling CD-ROMs in accordance with the invention.

FIG. 2 is an isometric view of the picker slide in the system of FIG. 1.

FIG. 3 is a top plan view, partly broken away, of one embodiment of a CD-ROM caddy incorporating the invention.

FIG. 4 is a rear elevational view of the embodiment of FIG. 3.

FIG. 5 is an enlarged fragmentary view of the embodiment of FIG. 3.

FIG. 6 is an enlarged cross-sectional view taken along line 6—6 in FIG. 4.

FIG. 7 is an enlarged cross-sectional view taken along line 7—7 in FIG. 4.

FIGS. 8–11 are operational views illustrating the engagement and withdrawal of the CD-ROM caddy of FIG. 3 by the apparatus of FIG. 1.

DETAILED DESCRIPTION

In FIG. 1, the invention is illustrated in connection with a system which has a plurality of CD-ROMs stored in caddies 15 arranged in horizontally extending rows 16, with one or more drive units 17 for transcribing data on the CD-ROMs. The discs are transferred between the storage locations and the drives by a transport mechanism 18 which has a picker head 19 mounted on a horizontally extending bridge 21. The bridge moves vertically, and the picker head moves horizontally on the bridge. By moving the picker head and the bridge together, the picker head can be aligned with any storage location or drive unit in the system.

The picker head includes a slide assembly or carriage 22 which can be extended and retracted in a direction perpendicular to the movement of the picker head and bridge for inserting discs into and withdrawing discs from the storage locations and drive units. The slide assembly has a pair of parallel picker fingers 23 affixed rigidly thereto and extending axially in the direction of slide movement. Each of the fingers has a hook portion 24 which extends in a lateral direction from the free end of the finger for engagement with the caddies in a manner discussed more fully hereinafter. The cartridges are stored in an upright or vertical position and transcribed in a horizontal position, and the slide assembly is rotatable about its axis to orient the picker fingers and any cartridge carried thereby in the proper plane.

As illustrated in FIGS. 3–7, each of the CD-ROM caddies has a relatively thin, generally rectangular base 26 which defines a generally circular well 27 in which a CD-ROM 28 is placed. A cover 29 is hingedly connected to the base toward the front edge of the caddy to permit insertion and removal of the CD-ROM and retain the CD-ROM in the well in its closed position.

The cover is held in the closed position by a pair latches 31 which are located toward the rear corners of the caddy. Each of the latches comprises a generally U-shaped arm 32, one leg 33 of which is affixed to the base, with the other two legs 34, 36 extending around and forming the corners of the caddy. The inner legs have shoulders 37 which are engaged by hooks 38 on the under side of the cover. The arms are somewhat flexible, and the latches are released by squeezing the outer legs 36 of the two latches together to deflect legs 33 in an inward direction and thereby disengage the shoulders from the hooks. With the latches and hooks disengaged, the cover can be opened by lifting up on a tab 39 which projects through a notch 41 in the rear wall 42 of the base.

A pair of handles 43 are provided on the rear edge of the caddy for engagement by the hooks of the transport mechanism. The handles are formed by cutting away portions of rear wall 42, leaving a pair of short rigid bars which form the handles, with openings 44 in the wall adjacent to the handles. Apertures 46 are formed in the base adjacent to the handles and extend through the base in a direction perpendicular to its major dimensions. Notches 47 are formed in the rear edge of the cover in registration with apertures 46.

Operation and use of the apparatus, and therein the method of the invention, are illustrated in FIGS. 8–11. For purposes of this description, it is assumed that a CD-ROM caddy is to be removed from a drive unit in which the caddy has a horizontal orientation. Removal from a storage location is similar except that the picker fingers and the caddy would have a vertical orientation. As the picker slide 22 is extended toward the caddy, fingers 23 pass through openings 44 to the side of handles 43 until the hook portions 24 of the fingers are aligned with apertures 46. The fingers are then shifted laterally by moving the bridge of the picker assembly in a downward direction to bring the hook portions into the apertures. The slide assembly is then retracted with the hook portions of the fingers engaging the handles and withdrawing the caddy with the assembly.

The process for retrieving a caddy from a storage slot is identical to withdrawing one from a drive unit except that the picker head is moved laterally on the bridge rather than moving the bridge vertically to provide the lateral shift of the fingers which brings the hooks into the apertures.

With the openings 44 in the rear edge of the caddy, the picker fingers can enter the caddy from directly behind and can make the lateral shift to engage the hooks entirely within the confines of the caddy. This permits the caddies to be stored closer together than they could if operating space fort he picker had to be left between the caddies. It also reduces the possibility of the fingers damaging something inside a drive unit.

The CD-ROM caddy with which the invention has been illustrated is a type which is now widely available on a commercial basis and is believed to have originated with Sony. The commercially available caddies do not, however, have the handles or other means by which they can be easily and safely engaged by the transport mechanism.

It is apparent from the foregoing that a new and improved apparatus and method for handling CD-ROMs have been provided. While only certain presently preferred embodiments have been described in detail, as will be apparent to those familiar with the art, certain changes and modifications can be made without departing from the scope of the invention as defined by the following claims.

We claim:

1. In a CD-ROM caddy for use in a system having a transport mechanism for transferring CO-ROMs between storage locations and a drive unit: a generally rectangular base defining a well for holding a CD-ROM, a cover hingedly mounted to the base toward a first edge thereof for holding the CD-ROM in the well when in a closed position, latch means located toward two adjacent corners of the base opposite the first edge for holding the cover in the closed position, and a pair of handles formed along a second edge of the base opposite the first edge for engagement by the transport mechanism.

2. The CD-ROM caddy of claim 1 including apertures in a portion of the base adjacent to the handles and a pair of notches opening through an edge of the cover in registration with the apertures to permit access to the handles when the cover is in the closed position.

3. The CD-ROM caddy of claim 1 including openings in a portion of the second edge of the base adjacent to the handles through which the transport mechanism can pass without going beyond the confines of the caddy.

4. In apparatus for transporting CD-ROMs between storage locations and a drive unit: a plurality of generally planar protective caddies in which the CD-ROMs can be placed, a pair of handles formed in an edge portion of each of the caddies, a pair of openings in each of the edge portions adjacent to the handles, a transport mechanism having a pair of generally parallel, axially extending fingers having hook portions extending laterally therefrom for engagement with the handles, means for advancing the fingers axially toward one of the caddies with the fingers passing through the openings and into the caddy, means for moving the fingers laterally to engage the hook portions with the handles, and means for retracting the fingers with the hook portions engaging the handles to withdraw the caddy with the fingers.

5. In a method of transporting CD-ROMs between storage locations and a drive unit, the steps of: placing each of the CD-ROMs in a generally planar protective caddy having a pair of handles formed in an edge portion thereof and openings in the edge portions adjacent to the handles, advancing a pair of axially extending fingers with laterally extending hook portions toward one of the caddies with the fingers passing through the openings and into the caddy, moving the fingers laterally to position the hook portions in alignment with the handles, and retracting the fingers so that the hook portions engage the handles and withdraw the caddy with the fingers.

* * * * *